E. FAINT.
MEANS FOR BALING HAY.
APPLICATION FILED OCT. 27, 1915.
1,218,175.
Patented Mar. 6, 1917.
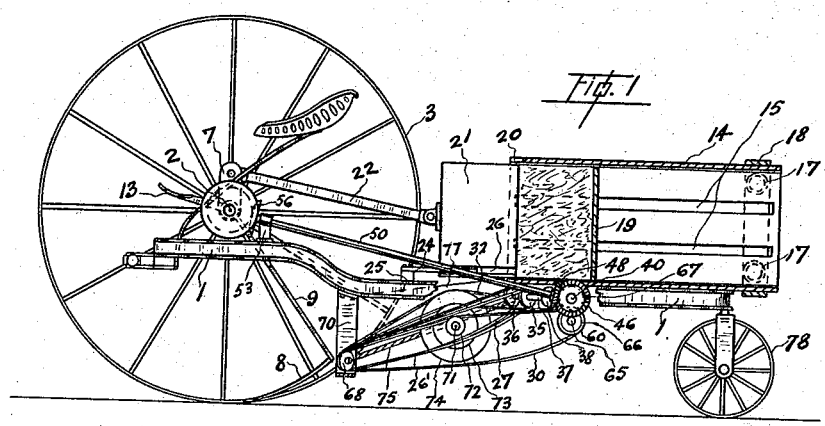
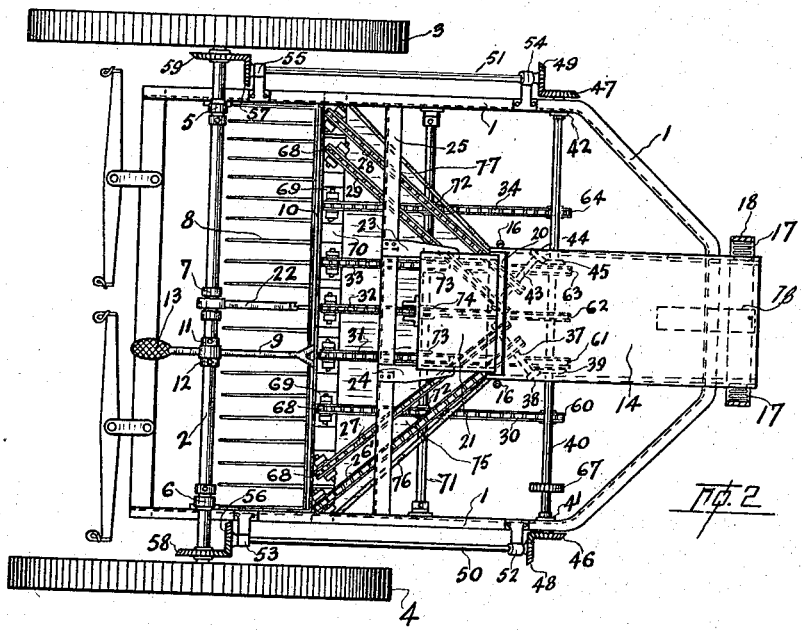
WITNESSES.
INVENTOR.
EDWARD FAINT.

UNITED STATES PATENT OFFICE.

EDWARD FAINT, OF OKANAGAN LANDING, BRITISH COLUMBIA, CANADA.

MEANS FOR BALING HAY.

1,218,175. Specification of Letters Patent. Patented Mar. 6, 1917.

Application filed October 27, 1915. Serial No. 58,231.

*To all whom it may concern:*

Be it known that I, EDWARD FAINT, a subject of the King of Great Britain, and a resident of the town of Okanagan Landing, in the Province of British Columbia, Canada, have invented certain new and useful Improvements in Means for Baling Hay, of which the following is a specification.

My invention relates to improvements in means for baling hay, and the object of my invention is to provide a device by means of which the hay, after being cut, is raked and then delivered to a press so that it may at once be baled in its dry state ready for market, thus doing away with the necessity of leaving the cut hay in the field as at present, whereby it oftentimes becomes damaged from rain and adverse weather conditions.

I attain this object by the means illustrated in the accompanying drawings in which—

Figure 1 is a side elevation of my device, in part section, the near side wheel being removed.

Fig. 2 is a plan view.

1 indicates the frame of my device, formed of any suitable material, such as steel channel sections, and on which frame is mounted the axle 2 having secured thereon the wheels 3 and 4, the axle being rotatably supported in suitable bearings 5 and 6 secured to the frame and provided with a crank 7.

A rake 8 is disposed between the wheels 3 and 4 and is supported by any suitable means, such as by the bar 9, the lower end of which is secured to the rake head 10 and which bar is pivotally mounted in suitable location on the axle 2 between the collars 11 and 12 and is provided with an extension terminating in a foot pedal 13, so that the rake may be dumped, if desired, by pressing on the pedal 13. It may be stated that more than one such supporting bar 9 may be employed if deemed necessary, and that the rake may be secured in operative position by any of the tripping and locking devices common to this class of machine and well known to those skilled in the art.

Secured to the frame 1 and centrally with the crank 7 is a box 14, the sides of which are preferably slotted as at 15 in Fig. 1 and hingedly connected at their inner ends to the top and bottom portions as indicated at 16 in Fig. 2, so that they may be normally inclined inward by the springs 17, which springs are normally in tension and are carried by a suitable frame 18. It will thus be seen that while the top and bottom portions of the box are parallel, the sides converge toward the rear end, as shown dotted in Fig. 2, but that these sides may be forced out to a parallel position by pressure from the inside of the box, being returned, however, to their normal position by the springs 17 when the pressure is relieved. 19 indicates a flat portable member the dimensions of which are such that it will fit slidably the mouth of the box 14 at its inner end, and 20 indicates an opening provided in the upper portion of the box through which the member 19 is dropped, as hereinafter described. A plunger 21 is provided for operation in the box 14, being actuated by the crank 7, to which it is connected by the connecting rod 22. The plunger 21 may be supported when withdrawn from the box 14 by any suitable means, such as the guide plates 23 and 24 rigidly secured to a brace member 25, these guide plates fitting slidably grooves 26 formed in the sides of the plunger.

26—27 and 28—29 indicate conveyers adapted to carry the raked hay from the ends of the rake 8 to the mouth of box 14, while 30, 31, 32, 33 and 34 indicate conveyers adapted to carry the hay to the box from the center of the rake. These conveyers may be of any kind found suitable for the purpose, and by way of illustration chain conveyers are shown. The conveyers 26—27 are driven from their upper ends by means of sprockets 35—36 respectively secured to a shaft 37 rotatably mounted on the underside of the box 14, which shaft is provided with a pinion 38 meshing with a pinion 39 secured to a transverse shaft 40 extending across the frame 1 and rotatably supported thereon by suitable bearings 41 and 42.

The conveyers 28—29 are driven in a similar manner, their driving sprockets being secured to a shaft 43 also rotatably mounted on the underside of the box 14, the shaft 43 being provided with a pinion 44 meshing with a pinion 45 secured to the transverse shaft 40.

The ends of the transverse shaft 40 are preferably extended through the frame 1 and provided with pinions 46 and 47 respectively, which pinions mesh with pinions 48 and 49 respectively, secured to shafts 50 and 51. These shafts are rotatably supported on the frame 1 by the bearings 52—53 and 54—55, and are provided with pinions 56 and 57 respectively meshing with pinions 58 and 59 secured to the main axle 2.

The conveyers 30, 31, 32, 33 and 34 are driven from their upper ends by means of sprockets 60, 61, 62, 63 and 64 secured to a transverse shaft 65 rotatably mounted on the frame 1 and disposed directly below the shaft 40, the shaft 65 being provided with a gear 66 meshing with a gear 67 secured on shaft 40.

The lower ends of all the conveyers travel over sprockets indicated generally by the numerals 68 in Fig. 1, these sprockets being rotatably carried in bearings 69, which bearings are supported on a suitable supporting member 70 rigidly secured to the frame 1.

In order to carry up the working portions of the chains of conveyers 30, 31, 32, 33 and 34 to the proper heights for clearing the side conveyers 26—27 and 28—29 a transverse shaft 71 is rotatably mounted on the frame 1 at a suitable location, which shaft carries idler sprockets over which the respective working portions of the conveyers travel, sprockets 72 being provided for conveyers 30 and 34, sprockets 73 for conveyers 31 and 33, and sprocket 74 for the center conveyer 32. These sprockets are of course, made of diameters to suit the conditions and design of the machine.

A platform 75 adapted to extend between the supporting member 70 and the mouth of box 14 is provided to receive any hay that may drop off the respective conveyers, being disposed directly under the working portions of same and which platform is provided with the vertical sides 76 and 77, which serve to direct the hay carried by the side conveyers toward the mouth of the box 14. The rear end of the machine is supported by a swivel wheel 78.

The manner in which the machine operates will be apparent, on reference being made to Figs. 1 and 2, and may be described briefly as follows:—The machine is horse-drawn similar to the ordinary horse rake, and on being set in motion the axle 2 is rotated by the revolving wheels 3 and 4, causing the plunger 21 to be reciprocated and to move in and out of the box 14. At the same time the shaft 40 is rotated by the rotation of shafts 50 and 51, driven by the axle pinions 58 and 59, the shaft 40 in turn rotating the shafts 37 and 43 and setting the conveyers 26—27 and 28—29 in motion. Simultaneously the rotation of shaft 40 causes shaft 65 to rotate and set in motion the conveyers 30, 31, 32, 33 and 34. It will thus be seen that when the machine is moving forward all the conveyers will be in motion and the plunger 21 will be moving into and out of the box 14 alternately. The cut hay lying in the path of the rake 8 will be gathered up thereby and delivered on to the upwardly moving chains of the conveyers and carried by them up to and into the mouth of the box, into which it will be forced by the plunger 21. The portable member 19 is first of all dropped into the box, so that it will be seen that the hay is compressed between the member 19 and the plunger 21. Each time the plunger is withdrawn more hay enters the box, and on the return stroke of the plunger, the hay is forced farther into the box, carrying the member 19 with it. However, as the size of the member 19 is the same as the mouth of the box at its inner end and greater than the normal opening at the outer end, it will be apparent that considerable force is required to push the member 19 through the box so that, by the time the member 19 forces the sides of the box outwardly against the springs 17 to a parallel position so that it may pass therebetween and be ejected, the hay is compressed into a marketable bale. The portable member 19 is then dropped into the box again through the opening 20 and, the foregoing operation being repeated the compressed bale is forced out of the box the while another bale is being formed. It will, of course, be understood that any of the well known binders may be used with the machine described in the foregoing specification.

What I claim as my invention is:—

1. In a device of the class described, the combination with a wheeled frame and a hay rake carried thereby, of a bale forming receptacle mounted centrally and longitudinally on said frame, a reciprocating plunger fitting the mouth of said receptacle, independent parallel conveyers adapted to carry the hay from the intermediate portion of the rake to the mouth of the receptacle, and independent inwardly converging conveyers adapted to carry the hay from each end of the rake to the receptacle.

2. In a device of the class described, the combination with a wheeled frame and a hay rake carried thereby, of a bale forming receptacle mounted centrally and longitudinally on said frame, a reciprocating plunger fitting the mouth of said receptacle, independent parallel conveyers adapted to carry the hay from the intermediate portion of the rake to the receptacle, independent inwardly converging conveyers adapted to carry the hay from the ends of the rake to the receptacle, and a platform disposed between said rake and the mouth of said receptacle and extending underneath said conveyers, said platform having upwardly directed inwardly converging sides adjacent the outermost inwardly converging conveyers.

Dated at Revelstoke, B. C., this 17th day of September, 1915.

EDWARD FAINT.

Witnesses:
 JAMES COSFORD,
 JOHN DRINKWATER SIBBALD, Jr.

Copies of this patent may be obtained for five cents each, by addressing the "Commissioner of Patents, Washington, D. C."